United States Patent [19]
van Essen

[11] 4,130,486
[45] Dec. 19, 1978

[54] METHOD AND DEVICE FOR THE SEPARATION OF A LIQUID-CONTAINING MIXTURE

[75] Inventor: Uilke van Essen, Gorinchem, Netherlands

[73] Assignee: Pollutex Milieutechniek B.V., Rijswiji, Netherlands

[21] Appl. No.: 660,186

[22] Filed: Feb. 23, 1976

[51] Int. Cl.² .................................... B01D 33/02
[52] U.S. Cl. ............................... 210/78; 210/79; 210/386; 210/400; 210/500 R
[58] Field of Search ............... 210/65, 77, 78, 358, 210/360 R, 370, 386, 387, 400, 401, DIG. 3, DIG. 4, 79, 500 R

[56] References Cited

U.S. PATENT DOCUMENTS

| | | | |
|---|---|---|---|
| 1,767,905 | 6/1930 | Walker | 210/400 X |
| 1,950,869 | 3/1934 | Stuart | 210/DIG. 4 |
| 2,544,816 | 3/1951 | Wedler | 210/DIG. 4 |
| 2,881,127 | 4/1959 | Hetzel | 210/400 X |
| 3,487,927 | 1/1970 | Yahnke | 210/400 X |
| 3,616,931 | 11/1971 | Zievers | 210/DIG. 4 |
| 3,661,266 | 5/1972 | Von Rotel | 210/DIG. 4 |
| 3,800,952 | 4/1974 | Bastgen | 210/400 X |
| 3,819,474 | 6/1974 | Holz | 210/400 X |

FOREIGN PATENT DOCUMENTS

| | | | |
|---|---|---|---|
| 826158 | 8/1975 | Belgium | 210/DIG. 4 |
| 7402747 | 9/1975 | Netherlands | 210/DIG. 4 |

Primary Examiner—Richard L. Chiesa
Attorney, Agent, or Firm—Finnegan, Henderson, Farabow & Garrett

[57] ABSTRACT

A method of and device for separating a liquid-containing mixture into two phases including a flexible liquid permeable belt moved through a helicoidal path. The mixture to be separated is deposited on the belt and, as the belt moves through the helicoidal path, the liquid passes through the belt while solid material is retained thereon. At the end of the helicoidal path, the solid material is removed from the belt. The belt may be used alone, or together with another overlying belt, or the belt may be a tube slit along its length.

12 Claims, 4 Drawing Figures

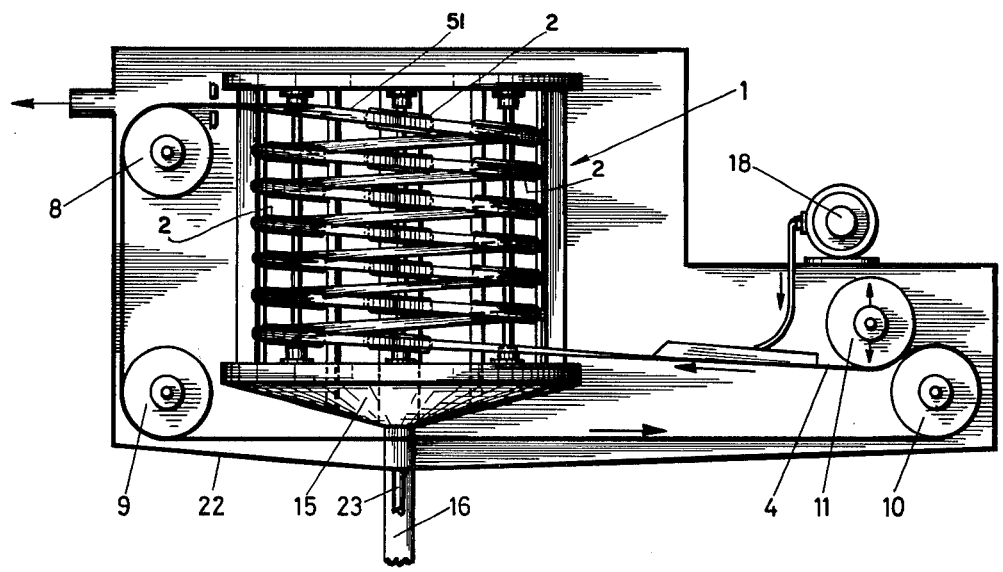
Fig_3
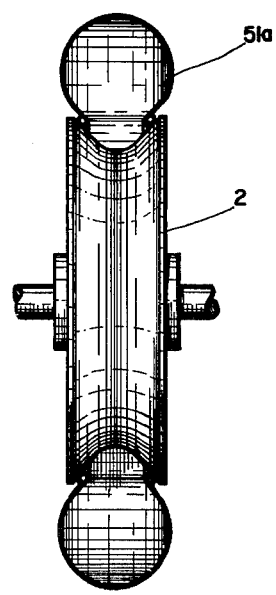
Fig_4

METHOD AND DEVICE FOR THE SEPARATION OF A LIQUID-CONTAINING MIXTURE

The invention relates to a method for the separation of a liquid-containing mixture into two phases by subjecting the mixture to be separated according to the principle of centrifugal force. The invention relates further to a device for separation in a mechanical way of a liquid-containing mixture into two phases, by application of the centrifugal force, as well as to special embodiments and parts of it.

Quite often sincere problems are encountered in the separation of liquid-containing mixtures, such as mud, oil-containing impurities, products of agriculture, cattle-breeding, products of chemical process- and foodstufftechnology, until at the one side a substantially dry product is obtained and at the other side a liquid is obtained, which is lessened of solid substances.

In many cases insufficient separation is obtained, or the method followed is too time consuming and thus not efficient, while used installations occupy large volumes and areas and consequently are expensive in investment. Moreover there is the fact, that the environmental hygiene poses severe requirements with regard to, for instance, the purification of waste sludge.

For the separation of slurry-like mixtures centrifuges, separators and decanters are known in the art. A review of similar known methods and devices is given in "Polytechnisch Tijdschrift", Ed. "Procestechniek", 29 (1974), pages 460–488.

Particular difficulties are met in such installations when the material to be separated contains large amounts of solids and/or semi-solids. In such cases clogging appears very often and the installations need much maintenance. It has appeared that in many cases a complete or substantially complete separation is not possible unless cascades of centrifuges are used, which demand large investments.

Moreover, with the known installations a continuous process is not possible. Although there are types of installations which can be filled from a conveyor or gutter and which are self-discharging it will yet be necessary to stop these at intervals since otherwise substances may remain behind. Besides the wear of many of these types of installations is also very considerable.

The object of the invented method is the elimination of the aforesaid drawbacks.

Therefore a method according to the invention and as indicated hereabove is characterized in that the mixture to be separated is continuously supplied to an endless, moisture-permeating, flexible surface, which is led with large speed according to a helicoidal line around a substantially vertical axis by driving means. Then the liquid is pushed through said flexible material and centrifuged away.

The flexible surface may have the shape of a belt or strip upon which the mixture to be separated can be deposited, whereafter said belt or strip is tilted and is led into the direction of a helicoidal line.

Immediately after the deposition upon said belt or strip the mixture to be separated may be covered by a second flexible surface, for instance also in the shape of a belt or strip. Then said second belt or strip also moves in the abovementioned helicoidal line, so that the mixture is situated between both belts or strips and is kept there, which is particularly advantageous for materials of relatively low viscosity.

As a moisture-permeating flexible surface a belt or strip may be used of woven or braided or twisted metallic wire, of plastics material, reinforced or not, or rubber and/or of canvas. Said belt or strip might be substantially flat or slightly concave in cross section.

According to a preferred embodiment of the invention said moisture-permeating flexible surface consists of a tube cut open in longitudinal direction, but a flat belt or strip may often be used with good results as well, depending on the kind of the mixture to be separated. If two belts or strips are used and the mixture to be separated is deposited between said belts or strips, it is preferred, that both belts or strips are substantially flat in cross section.

If the mixture to be separated comprises water, the flexible belt or strip may consist of a hydrophobic material, or a material may be used, which is impregnated hydrophobically.

If the mixture to be separated is oily, or if it comprises oily constituents, such as crude oil, said belt or strip may consist of a hydrophilic material or it may be impregnated in such a way.

If two belts or strips are used both or one only of said belts or strips may consist of such a material or may be impregnated in said way.

In the process according to the invention the speed of the flexible surface or of both flexible surfaces respectively is raised in such a way, that the mixture introduced will be delivered substantially free of liquid or, if desired, be delivered partly or largely freed of liquid.

The speed may be 15 to 60 m/sec, and the selected speed depends of course on the velocity of the input of material, but this should be such, that the liquid is pushed through the moisture-permeable flexible material by means of the centrifugal force, and is then centrifuged away.

If necessary or desirable a flocculent agent may be added to the mixture prior to or during the transport to the flexible surface.

The installation according to the invention is characterized by an endless, moisture-permeating flexible surface, by transport means for introducing the mixture to be separated, and by driving and conducting means in order to conduct said surface with the mixture thereupon in accordance with a helicoidal line around a substantially vertical axis.

Said driving and conducting means may have the shape of wheels or rollers, and around the travelling surface of same the moisture-permeating flexible surface having the shape of a belt or strip may be conducted with high speed. If two belts or strips are used both are conducted around said wheels or rollers, while the mixture to be separated is contained between both belts or strips.

The wheels or rollers are placed upon vertical axes, such that these may spin or rotate substantially horizontally or under a small angle towards the horizontal level, and the axes are placed in such a way, that the belt or strip runs substantially helicoidally, preferably from downside to the top, whereafter said belt or strip is directed backward to the start of the helicoidal run by means of turning rollers.

Around and between the rollers partition bulkheads may be placed, serving for the removal of centrifuged liquid.

The rollers may consist of metal, rubber and/or plastics material, and they may have a cambered runner surface.

During the helicoidal run of the belt or of the belts a centrifugal force exists, whereby the liquid is centrifugally pushed through said belt, which proceeds along the outside of the way to be followed. Said liquid is preferably kept by bulkheads and directed downward into a funnel. After having completed its way around the helicoidally placed rollers the dry or substantially dry material is removed by a change or direction of the belt; moreover the dry or substantially dry solid material may be blown away from the belts by means or compressed air or may be removed mechanically. Subsequently it is moved away through a conduit.

The process according to the invention has the advantages, that a slurry or sludge may be separated into solid material and liquid in a continuous way and with considerable velocity by means of the action of the centrifugal force, and in this process an efficiency of the separation is obtained which is higher than by use of the conventional separating devices, while furthermore no impetus of the liquid into the untreated part of the material will take place.

The process is well controllable and it may be adapted to different materials. Large volume amounts per unit of time may be treated, while in the material a uniform separation is obtained.

The process and the installation are further explained with reference to the enclosed figures, which represent examples of preferred embodiments and which should not be regarded as restrictions.

FIG. 3 shows a vertical cross section of an installation having one belt according to the invention.

FIG. 4 shows a cross section of a roller with a belt, having a shape in cross section of a circular segment, which may be an open cut tube. The figure shows how said belt runs over the roller.

Figure 1:
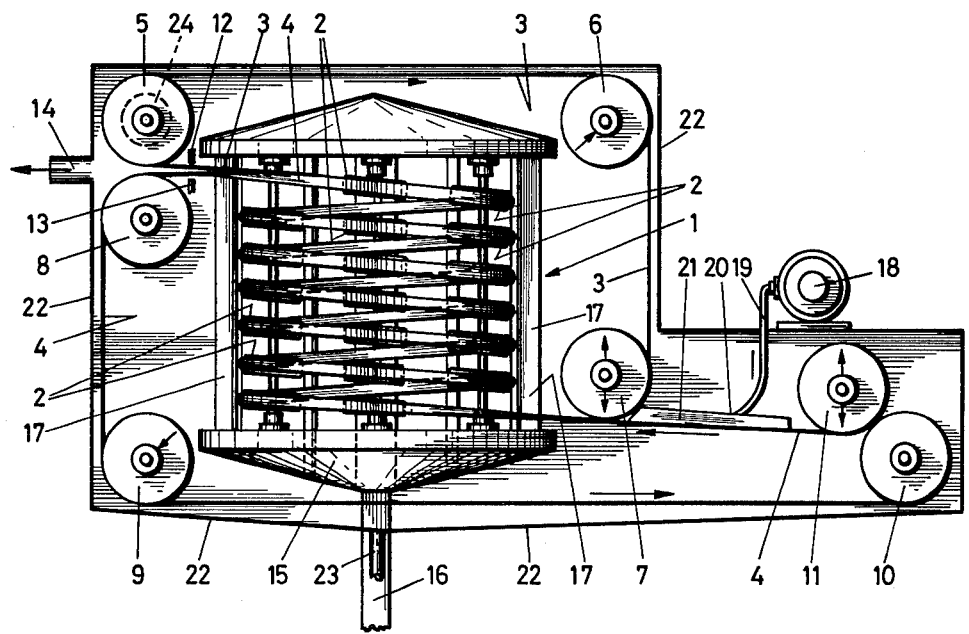
FIG. 1 shows a vertical cross section of an installation having two belts.
Figure 2:
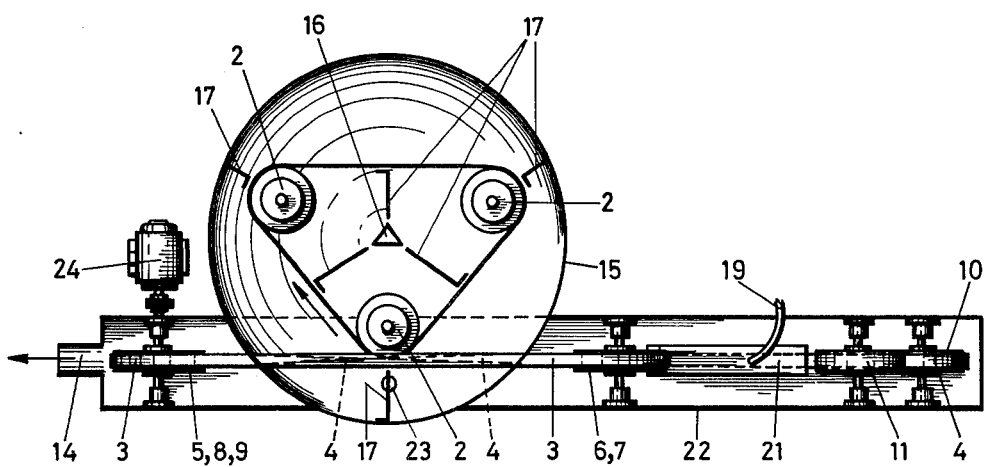
FIG. 2 shows a horizontal cross section of the same installation.

In FIGS. 1 and 2 a number of rollers (2) are placed on axes in the container (1) in such a way, that both belts (3) and (4) may be conducted around said rollers in a helicoidal way.

The belts are guided about the rollers 2 along the generally helicoidal path with portions of the belts between adjacent rollers extending along linear paths and the portions of the belts about rollers 2 extending along arcuate or sprial segments of the helicoidal path.

The belts consist of the same or each of different porous or perforated material, for example of a fabric. The belt (3) runs over the roller (5), which functions as driving means as well, over a control roller (6), a conducting and/or adjusting roller (7) and back again around the rollers (2) which are placed helicoidally. The belt (4) also runs over the rollers (2) but subsequently over the conducting rollers (8) and (9), over the reversing roller (10), along the stretching roller (11) and the conducting and/or adjusting roller (7). The mixture to be separated, for example a sludge, mud, slurry or a chemical product, is fed upon the belt by means of the conduit pipe (19) according to gravity and/or by means of the pump (18) through jet nozzle (20) upon a place, situated between rollers (7) and (11).

Preferably in order to avoid splashing or spilling of the mixture on this place a splash-cap (21) is situated.

Both the belts (3) and (4), where in between the mixture to be separated is situated, enter the container (1) after having passed the rollers (7), are tilted at an angle of for example 90°, and subsequently run around the rollers (2). Here the separation of the liquid is effected as a result of the existing centrifugal force.

At the exit of the container (1) the material is removed from said belts by a change of direction of said belts, which is improved by for example blowing compressed air through the jet nozzles (12) and (13) and to remove the material in this way, and subsequently the solid material leaves the device through the conduit pipe (14), and the belts are separated again and each is separately led around roller (5) and (8) respectively.

The lower part of the container (1) is formed by a funnel (15), wherein the removed liquid is gathered and conducted away through the tube (16). Along the walls of the container (1) and between the rollers (2) vertical partition bulkheads (17) are situated, in such a way, that the liquid, which is centrifuged away, is directed quickly into the funnel (15).

The entire device may be built in a closed protective housing (22), so that probable offensive smells of the material or the sludge are held up. The protective housing (22) and the container (1) may be provided with view glasses or openings at one or several discrete positions, whereby the course of the separation process may be followed visually. The protective housing may be provided with a discharge conduit pipe (23), by which probable leaking liquid may be discharged to the outlet tube (16).

The installation may be driven by one or several rollers, for example by means of a rotary current or direct current motor (24) coupled with roller (5), so that the speed of the belts may be controlled by means of controlling the speed of revolutions of said motor, with a continuous or a stepwise transmission. The speed may be 15–60 m/sec, for example 40 m/sec.

The number of rollers (2) depends on the kind of the mixture, for which the installation will be used preferably, and on the percentage of liquid, which is to be separated.

FIG. 3 shows the installation according to the invention, comprising one belt only. Said belt, indicated at 51, may be flat, but is preferably shaped as a circular segment in cross-section as shown at 51a in FIG. 4. In flat form, the single belt 51 may have a width of 60 cm while in cambered form (FIG. 4) it has a cross-section radius of 20 cm.

By means of these installations a mixture may be separated from a liquid, which is present in said mixture, and the process may be carried out continuously and in a fast and efficient way, while the pure liquid and a cake, consisting of the solid particles, are obtained separately.

The following example may serve as an explanation of an embodiment, but it should not be regarded as restrictive.

EXAMPLE

An installation as depicted in FIGS. (1) and (2), in this particular case having 19 rollers (2) upon vertical axes, was driven by means of a rotary current motor of 3 HP. A voluminous slurry of mineral sludge material comprising 90% by weight of water was deposited upon the belt (4). Each of the used belts was 0.2 mm thick and about 25 m long, and each consisted of a plastics material reinforced with glass fibres, having openings with a diameter of $20/\mu$. Each of the belts had a width of 12.5 cm. In this experiment the liquid was stripped of mineral sludge at two different speeds, viz. 10 and 15 m$^3$ of mixture per hour respectively. It was possible to observe the course of the process very well through two view openings in the container. After the treatment a substantially dry cake was obtained, and it appeared, that it comprised 20% by weight of water only (based upon the total material). Under the funnel water was obtained, which showed to be substantially clear and colorless.

I claim:

1. A method for the separation of a liquid-containing mixture into two phases using a first endless liquid permeable flexible belt disposed about spaced guide rollers, said method comprising the steps of guiding said belt about the spaced guide rollers along a generally helicoidal path with the portions of said belt between adjacent rollers and in said generally helicoidal path extending along linear paths and the portions of the belt about the rollers extending along spiral segments of the helicoidal path, depositing said material on said endless liquid-permeating first flexible belt while said first belt is moving in a linear path, thereafter moving said belt in said generally helicoidal path with said material on an interior surface of said belt and at a speed sufficient to cause the liquid portion of said mixture to pass through said belt by centrifugal force, and removing the solid part of said mixture from said belt at the end of said helicoidal path.

2. A method according to claim 1 which further includes the step of causing a second flexible belt to cover said first flexible belt after said mixture is deposited thereon, and separating said first and second belts at the end of said helicoidal path to facilitate removal of said solid material.

3. A method according to claim 2 wherein at least said first belt is a hydrophobic material.

4. A method according to claim 2 wherein at least said first belt is a hydrophillic material.

5. A method according to claim 1 which further includes the step of tilting said first belt through substantially 90° after depositing said material thereon and as said belt enters said helicoidal path.

6. A method according to claim 1 wherein said first belt is constructed of woven or braided metallic wire, plastic material, rubber and/or canvas material.

7. A method according to claim 1 wherein said belt is constructed of a perforated tube cut open in a longitudinal direction.

8. A method according to claim 1 wherein the speed of the belt is from about 16 to 60 meters per second.

9. A device for separation of a liquid-containing mixture into two phases, in a mechanical way, by application of centrifugal force, said device comprising an endless moisture permeable, first flexible belt, drive means driving said belt, guide means for said belt causing said belt to move through a generally helicoidal path including spaced guide rollers, said belt being disposed about said rollers in said helicoidal path with the portions of said belt between adjacent rollers and along said helicoidal path extending along linear paths and the portions of the belt about said rollers extending along spiral segments of the helicoidal path, means introducing the mixture to be separated onto said belt before it enters said helicoidal path, said mixture being retained on an inner surface of said belt through said helicoidal path, the liquid portion of said mixture permeating said belt by centrifugal force.

10. A device according to claim 9, said device including a second flexible belt, guide means causing said second belt to overlay and run together with said first belt through said helicoidal path to retain said material on said first belt, said guide means for said second belt causing said second belt to be separated from said first belt when said mixture is introduced thereon, said guide means for said second belt also causing said second belt to separate from said first belt upon completion of said helicoidal path to facilitate removal of solid material from said first belt.

11. A device according to claim 9, which includes bulkheads surrounding said belt as it passes through said helicoidal path and confining the liquid centrifuged from said mixture through said belt.

12. A device according to claim 11, characterized in that the rollers may consist of metal, rubber and/or a plastics material and that they have a cambered runner surface.

* * * * *